(12) United States Patent
Thompson, Jr. et al.

(10) Patent No.: US 9,922,634 B2
(45) Date of Patent: Mar. 20, 2018

(54) SOUND INSULATION CONSTRUCTIONS AND METHODS OF USING THE SAME (75) Inventors: Delton R. Thompson, Jr., Woodbury, MN (US); Ronald W. Gerdes, St. Paul, MN (US); Brian L. Nelson, Centerville, MN (US)

(73) Assignee: 3M INNOVATIVE PROPERTIES COMPANY, Saint Paul, MN (US)

(*) Notice: Subject to any disclaimer, the term of this patent is extended or adjusted under 35 U.S.C. 154(b) by 603 days.

(21) Appl. No.: 11/743,396

(22) Filed: May 2, 2007

(65) Prior Publication Data

US 2008/0001431 A1 Jan. 3, 2008

Related U.S. Application Data

(60) Provisional application No. 60/806,355, filed on Jun. 30, 2006.

(51) Int. Cl.
*G10K 11/168* (2006.01)
*B32B 5/26* (2006.01)
(Continued)

(52) U.S. Cl.
CPC .............. *G10K 11/168* (2013.01); *B32B 5/26* (2013.01); *B60R 13/08* (2013.01);
(Continued)

(58) Field of Classification Search
CPC ...... G10K 11/168; B32B 5/26; A47L 15/4209
(Continued)

(56) References Cited

U.S. PATENT DOCUMENTS 3,837,988 A 9/1974 Hennen et al.
5,536,556 A * 7/1996 Juriga ........................... 428/138
(Continued)

FOREIGN PATENT DOCUMENTS

EP 1091038 4/2001
GB 2163388 2/1986
(Continued)

OTHER PUBLICATIONS

Wolfe, "What is acoustic impedance and why is it important?". University of New South Wales. Downloaded from the internet (Oct. 1, 2011) (www.phys.unsw.edu.au/jw/z.html.*
(Continued)

*Primary Examiner* — Frank J Vineis (57) ABSTRACT

Sound insulation constructions, multilayer constructions for acoustically insulating a source of sound from a receiver that include one or more sound insulation constructions, structures comprising one or more sound insulation constructions and/or multilayer constructions, and a method for acoustically insulating a source of sound from a receiver. In some embodiments, the sound insulation construction includes a first layer and a second layer. The first layer can include a bonded fiber nonwoven web exhibiting a work of compression of at least about 0.7 kJ/m³ and an airflow resistance of no greater than 10,000 Rayls/m. The second layer can exhibit an airflow resistance of greater than 10,000 Rayls/m. In some embodiments, the method includes coupling the first layer to a surface of a vehicle to attenuate sound in at least a portion of the vehicle.

29 Claims, 5 Drawing Sheets

(51) Int. Cl.
*B60R 13/08* (2006.01)
*A47L 15/42* (2006.01)

(52) U.S. Cl.
CPC ......... *A47L 15/4209* (2016.11); *B60R 13/083* (2013.01); *B60R 13/0815* (2013.01); *B60R 13/0838* (2013.01); *B60R 13/0861* (2013.01); *B60R 13/0884* (2013.01)

(58) Field of Classification Search
USPC ........................................................ 442/389
See application file for complete search history.

(56) References Cited

U.S. PATENT DOCUMENTS

| | | | |
|---|---|---|---|
| 5,677,027 | A | 10/1997 | Masuda et al. |
| 5,824,973 | A | 10/1998 | Haines |
| 5,841,081 | A | 11/1998 | Thompson et al. |
| 6,508,897 | B1 | 1/2003 | Yamaguchi et al. |
| 6,720,363 | B2 | 4/2004 | Subramonian et al. |
| 6,986,229 | B2 | 1/2006 | Collison et al. |
| 7,000,729 | B2 | 2/2006 | Jacobsen |
| 2003/0032358 | A1 | 2/2003 | Yamaguchi et al. |
| 2003/0091806 | A1 | 5/2003 | Staelgraeve et al. |
| 2004/0002274 | A1* | 1/2004 | Tilton ........................ 442/381 |
| 2004/0053003 | A1 | 3/2004 | Coates et al. |
| 2004/0075290 | A1 | 4/2004 | Campbell |
| 2004/0077247 | A1 | 4/2004 | Schmidt et al. |
| 2004/0131836 | A1* | 7/2004 | Thompson ................ 428/304.4 |
| 2004/0231914 | A1* | 11/2004 | Thompson et al. ........... 181/284 |
| 2004/0231915 | A1* | 11/2004 | Thompson et al. ........... 181/290 |
| 2004/0238275 | A1 | 12/2004 | Keller et al. |
| 2005/0016793 | A1 | 1/2005 | O'Regan et al. |
| 2005/0020171 | A1 | 1/2005 | Yoshida et al. |
| 2005/0022548 | A1 | 2/2005 | Sishtla |
| 2005/0026527 | A1 | 2/2005 | Schmidt et al. |
| 2005/0064779 | A1 | 3/2005 | Allison et al. |
| 2005/0133973 | A1 | 6/2005 | Parrish et al. |
| 2005/0150720 | A1 | 7/2005 | Tudor et al. |
| 2005/0281999 | A1 | 12/2005 | Hofmann et al. |
| 2006/0029788 | A1 | 2/2006 | Lovell et al. |
| 2006/0057373 | A1 | 3/2006 | Inagaki et al. |
| 2006/0070326 | A1 | 4/2006 | Collison et al. |
| 2006/0072372 | A1 | 4/2006 | Thomas et al. |
| 2006/0090832 | A1* | 5/2006 | Allison et al. .................. 156/72 |

FOREIGN PATENT DOCUMENTS

| | | |
|---|---|---|
| WO | WO 9935007 A1 | 7/1999 |
| WO | WO 2004088025 A1 * | 10/2004 |
| WO | WO 2005005198 A2 * | 1/2005 |
| WO | WO 2005081226 A1 * | 9/2005 |

OTHER PUBLICATIONS

Ray, "Absorptive Silencer Design", Industrial Noise Series, Part VII, (2010).*
WO 02/09089, (2002), Coates et al., Machine Assisted Translation.*
Celanese Acetate LLC, Complete Textile Glossary, (2001), pp. 150, 151.*

* cited by examiner

SOUND INSULATION CONSTRUCTIONS AND METHODS OF USING THE SAME

CROSS-REFERENCE TO RELATED APPLICATION

This application claims the benefit of U.S. Provisional Patent Application No. 60/806,355, filed Jun. 30, 2006.

The invention relates to insulating a source of sound from a receiver using sound insulation constructions.

BACKGROUND

In vehicles, vibration and external noises such as road noise, engine noise, wind noise, and noises emanating from within passenger compartments are often attenuated and insulated through the use of sound insulating materials coupled to various components of the vehicle. Sound insulating materials have been positioned in or combined with a variety of components of a vehicle to reduce engine and road noise for the benefit and comfort of passengers.

There is a continuing need to increase the sound insulation associated with vehicles so as to limit the level of acoustic disturbance experienced by individuals positioned within the vehicle.

SUMMARY

Some embodiments of the present invention provide a sound insulation construction comprising a first layer and a second layer. The first layer can include a bonded fiber nonwoven web exhibiting a work of compression of at least about 0.7 kJ/m$^3$ and an airflow resistance of no greater than 10,000 Rayls/m. The second layer can be coupled to the first layer and can have an airflow resistance greater than 10,000 Rayls/m.

Some embodiments of the present invention provide a multilayer construction coupled to a surface of a structure and adapted to acoustically insulate a source of sound from a receiver. The multilayer construction can include a sound insulation construction.

In some embodiments of the present invention, a vehicle is provided. The vehicle can include a surface at least partially defined by a component of the vehicle, and a sound insulation construction coupled to the surface. The sound insulation construction can include a first layer comprising a bonded fiber nonwoven web exhibiting a work of compression of at least about 0.7 kJ/m$^3$ and an airflow resistance of no greater than 10,000 Rayls/m.

In some embodiments of the present invention, a method for insulating sound in at least a portion of a vehicle is provided. The method can include coupling a first layer comprising a bonded fiber nonwoven web to a surface of the vehicle, wherein the bonded fiber nonwoven web exhibits a work of compression of at least about 0.7 kJ/m$^3$ and an airflow resistance of no greater than 10,000 Rayls/m.

The present inventors have discovered that bonded fiber nonwoven webs that exhibit a sufficient work of compression and a sufficient degree of air permeability can be good sound absorbers, depending on the desired frequency range, and provide enhanced sound insulating properties when incorporated into sound insulation constructions. The sound insulation constructions of the present invention can function as at least one of an absorber, a decoupler, a damper, an absorber-decoupler, and a barrier-decoupler relative to a source of sound or a vibration. The invention also features methods of using sound insulation constructions for attenuating sound in various structures including, but not limited to, vehicles.

Other features and aspects of the invention will be apparent to those skilled in the art upon review of the following detailed description, claims and drawings.

DETAILED DESCRIPTION

The ability of a material to attenuate sound can depend on the material's sound transmission loss, damping capability, decoupling capability, and absorption capability.

A resonating body emits sound as acceleration waves which propagate along the body, or a surface thereof, (e.g., the sound resulting from striking a cymbal). Sound intensity is related to the maximum acceleration of the propagating waves and can be reduced through the application of energy-absorbing materials to the surface of the body. Energy-absorbing materials can both reduce the transmission of an energizing pulse (i.e., an event that initiates the acceleration wave) and dampen the acceleration wave created by converting the mechanical energy of the pulse and wave into heat. If a portion of the energy of the pulse and wave are converted into heat, less energy is available to create airborne sound (i.e., noise).

The sound insulation constructions of the present invention can reduce the transmission of an energizing pulse or event, and can also inhibit the propagation of sound (e.g., by damping an acceleration wave), at least partially reflect a sound wave back toward a source of sound, and combinations thereof, thereby at least partially acoustically insulating a source of sound from a receiver. As used herein, the phrase "insulating a source of sound from a receiver" is used broadly and encompasses both insulating the receiver from the source of sound, as well as insulating the source of sound from a receiver, and is not meant to be limiting or to imply direction.

Figure 1:
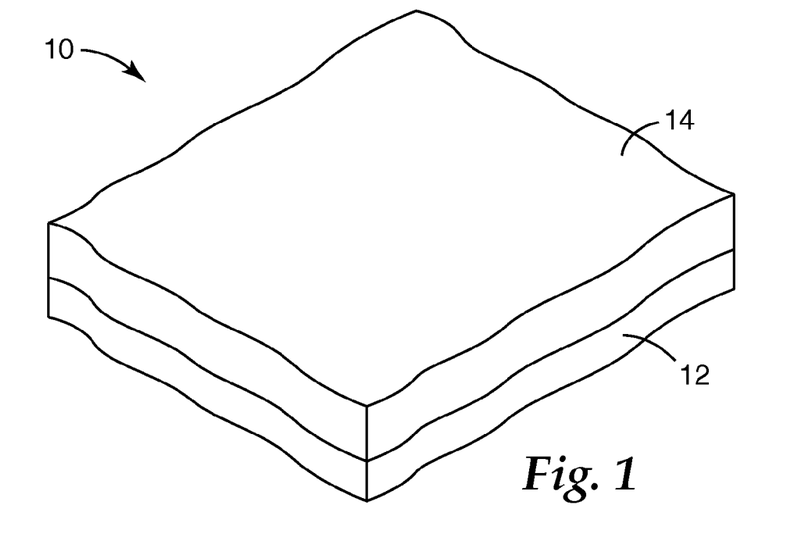
FIG. 1 illustrates a schematic perspective view of a sound insulation construction of the present invention.

FIG. 1 illustrates an example of a sound insulation construction 10 of the present invention that includes a first layer 12 that includes an air permeable, bonded fiber nonwoven web coupled to a second layer 14 that exhibits airflow resistance. The sound insulation construction 10 can function as an absorber, an absorber-decoupler, a decoupler, a damper, a barrier-decoupler, or a combination thereof, depending on the nature of the layers of the sound insulation construction 10, the location of the sound insulation construction 10 in an environment, and the type of component to which the sound insulation construction 10 is coupled. As used herein:

The term "bonded fiber nonwoven web" refers to a nonwoven web that includes fibers of a discrete length, filaments or a combination thereof bonded together.

The term "sound transmission loss" refers to a material's ability to reduce the flow of sound energy through the material.

The term "absorber" refers to a material that converts at least a fraction of incident sound or mechanical energy to heat substantially without reflection or transmission of the energy. The ability of a material to function as an absorber for a given frequency range is at least partially dependent on the material's thickness and complex impedance. Complex impedance is a function of the material's reactance and resistance. The specific acoustic impedance of a material, which is a type of complex impedance, is the complex ratio of the sound pressure at a point of the material to the particle velocity at that point and can be expressed in units of Rayls (Newton-seconds/meter$^3$). For fibrous materials, the specific acoustic impedance can depend on the frequency of interest, the thickness of the material, the bulk density of the material, the airflow resistance of the material, or a combination thereof. The sound absorption capability of a porous material may be influenced by changing the surface airflow resistance of the material. For example, thin airflow resistive membranes can be added to absorbers to adjust the acoustic impedance for a frequency range of interest, as described in U.S. Pat. No. 5,824,973, which is incorporated herein by reference.

The term "decoupler" refers to a material that isolates a source of acoustic energy from a receiver.

The term "barrier" refers to a material that impedes transmission of a sound wave by at least partially reflecting the sound wave.

The term "absorber-decoupler" refers to a material that absorbs and isolates a source of acoustic energy from a receiver.

The term "barrier-decoupler" refers to a material that impedes the transmission of a sound wave and isolates a source of acoustic energy from a receiver.

The term "damper" refers to a material that converts the mechanical energy of an oscillatory system to heat.

The term "coupled" and variations thereof is used broadly and encompasses both direct and indirect coupling.

When an element such as a layer or substrate is referred to as being "on" another element, it can be directly on the other element or intervening elements may also be present.

When an element is referred to herein as being "directly on" another element, there are no intervening elements present.

The term "vehicle" refers to an apparatus, device or structure that is capable of transporting a variety of objects, including living and non-living objects. Vehicles can include motorized and non-motorized vehicles. Motorized vehicles can include, but are not limited to, automobiles (e.g., cars, trucks, buses, vans, recreational vehicles (e.g., motor homes) etc.), trains, airplanes, boats, personal watercraft, motorized bicycles, combinations thereof, and a variety of other suitable motorized vehicles. Non-motorized vehicles can include, but are not limited to trailers, wagons, bicycles, combinations thereof, and a variety of other suitable non-motorized vehicles. In some embodiments of the present invention, the vehicle can include an enclosure in which one or more passengers can ride during transportation.

Sound Insulation Construction

The first and second layers of the sound insulation construction are coupled together using a variety of coupling means, including, but not limited to an adhesive composition. In some embodiments, the first and second layers form a unitary structure with discrete layers. The sound insulation construction can exhibit a variety of properties. When constructed to absorb sound, for example, the sound insulation construction can be tuned for maximum sound absorption over a predetermined frequency range. In some embodiments, the sound insulation construction absorbs at least about 40% of the emitted sound at a frequency of 1000 Hertz (Hz), at least about 60% of the emitted sound at a frequency of 1500 Hz, or a combination thereof.

The First Layer

The first layer of the sound insulation construction includes an air permeable, bonded fiber nonwoven web. The air permeable, bonded fiber nonwoven web can exhibit a work of compression that is at least about 0.7 kJ/m$^3$, at least about 0.8 kJ/m$^3$, at least about 1 kJ/m$^3$ or even at least about 2 kJ/m$^3$, and an airflow resistance of no greater than 10,000 Rayls/m, no greater than about 5000 Rayls/m, no greater than about 3000 Rayls/m, no greater than about 2000 Rayls/m, no greater than about 1500 Rayls/m, no greater than about 1000 Rayls/m, or even no greater than about 800 Rayls/m, depending on the desired type and amount of sound insulation.

In some embodiments, the first layer exhibits damping characteristics. One measure of damping is a damping loss factor. Useful first layers exhibit a damping loss factor of at least about 0.012 or even at least about 0.015. Another measure of damping is maximum acceleration. Useful first layers exhibit a maximum acceleration of no greater than about 10 gravities (g), no greater than about 6 g, no greater than about 3 g, or even no greater than about 2 g.

Suitable first layers exhibit a sufficiently low airflow resistance and sufficiently low maximum acceleration to provide a low acoustic performance parameter as described more fully below. In some embodiments, the first layer has an acoustic performance parameter of no greater than about 10,000 gravities-Rayls per meter (g-Rayls/m), no greater than about 6000 g-Rayls/m, no greater than about 4,000 g-Rayls/m or even no greater than about 1000 g-Rayls/m.

Suitable first layers can also exhibit a variety of other properties including, but not limited to, a density of at least about 15 kg/m$^3$, at least about 50 kg/m$^3$, or even at least about 100 kg/m$^3$, a basis weight of at least about 0.2 kg/m$^2$, at least about 0.5 kg/m$^2$, at least about 2 kg/m$^2$ or even at least about 4 kg/m$^2$, a solidity of no greater than about 0.3, no greater than about 0.2, no greater than about 0.05 or even no greater than about 0.03, and combinations thereof.

The first layer can have any suitable thickness including a thickness of least about 5 mm, at least about 10 mm, at least about 15 mm, at least about 20 mm or even at least about 30 mm.

In some embodiments, the first layer functions as a decoupler in the sound insulation construction.

Examples of useful first layer materials include a variety of bonded fiber nonwoven webs including, but not limited to:

(I) uniform, lofty, nonwoven webs of interlaced randomly disposed flexible organic thermoplastic fibers (examples of which are commercially available under the SCOTCH BRITE series of trade designation from 3M Company);

(II) lofty, open, nonwoven webs made of first and second crimped, staple, organic thermoplastic fibers (examples of which are commercially available under the SCOTCH BRITE series of trade designation from 3M Company);

(III) nonwoven webs of extruded or melt-spun polymer filament bundles of inter-engaged continuous crinkled coarse filaments of resilient thermoplastic polymer (an example of which is commercially available under the NOMAD trade designation from 3M Company);

(IV) sponge-like, compressible nonwoven webs that include randomly intermingled and randomly bonded hydrophobic fibers (an example of which is commercially available under the BUF PUF trade designation from 3M Company); and combinations thereof.

Useful nonwoven webs are also formed by a variety of processes including, but not limited to, processes that form spunbond, melt blown, spunbond-meltblown, air laid, wet laid, needle punched and coiled fiber webs, scrims, and combinations thereof. Material formulations for each exemplary type of nonwoven web are described in greater detail below.

Nonwoven Web I

One example of a useful class of nonwoven web includes uniform, lofty, nonwoven webs of interlaced randomly disposed flexible organic thermoplastic fibers that includes fibers that are adhesively bonded together at points where the fibers cross and contact each other to form a web having three-dimensionally integrated structure. The fibers can optionally be bonded at their crossing points by two distinct types of binders each existing in the web in the form of globules. Abrasive particles may be distributed throughout the web and firmly bonded to the web by a binder including, but not limited to, a relatively hard rigid binder, a resiliently rubbery binder or a combination thereof. The interstices between the fibers of the web are substantially unfilled with resin or abrasive. In one useful embodiment, the web includes a three-dimensionally extending network of inter-communicated voids such that the web includes at least about 75% by volume voids, at least about 85% by volume voids, at least about 90% by volume voids or even at least about 95% by volume voids. The web is flexible and readily compressible and, upon release of pressure, is capable of recovering substantially completely to its initial uncompressed form. In some embodiments, the uniform, lofty, nonwoven web of interlaced randomly disposed flexible organic thermoplastic fibers has a thickness of at least 5 mm, at least about 20 mm or even at least about 50 mm, and a basis weight of about 0.2 kilogram (kg)/square meter ($m^2$), at least about 0.3 kg/$m^2$ or even at least about 0.5 kg/$m^2$.

Useful fibers for forming the web include crimped fibers. The fibers can be formed from a variety of polymers including, but not limited to, synthetic polymers (e.g., nylon, polyester, rayon, cellulose acetate, and combinations thereof. The fibers can also be formed from inorganic materials such as glass, ceramic, metal, and combinations thereof. The fibers can be any suitable length including, but not limited to, from about 1 cm to about 10 cm, or even from about 2.5 cm to about 4 cm. The fibers can be any suitable diameter including, but not limited to, from about 25 µm to about 250 µm.

Useful binders include, but not limited to, phenol aldehyde resins, butylated urea aldehyde resins, epoxide resins, polyester resins (e.g., the condensation product of maleic and phthalic anhydrides and propylene glycol), and mixtures thereof.

Useful examples of uniform, lofty, nonwoven webs of interlaced randomly disposed flexible organic thermoplastic fibers and methods of making the same are disclosed in U.S. Pat. No. 2,958,593, which is incorporated herein by reference.

Nonwoven Web II

Other examples of useful classes of nonwoven webs include lofty, open, nonwoven webs made of first and second crimped, staple, organic thermoplastic fibers, examples of which are disclosed in U.S. Pat. No. 5,685,935, which is incorporated herein by reference. The first and second fibers of the web are melt-bonded together at least at a portion of the points where they contact. At least a portion of the first and second fibers of one major surface of the nonwoven web may have an abrasive coating bonded thereto, and at least a portion of the first and second fibers of the interior region have no abrasive coating bonded thereto.

The first and second crimped, staple fibers include a thermoplastic material sufficient to give the fibers a tenacity (i.e., break strength) of at least 1 gram per denier. The first crimped staple fibers can be made from a variety of polymers including, but not limited to, polyester, polyamide, rayon, polyolefins and mixtures thereof. Useful polyamides include, but are not limited to, polycaprolactam, polyhexamethyleneadipamide (e.g. nylon 6 and nylon 6,6), and combinations thereof. Useful polyolefins include, but are not limited to, polypropylene, polyethylene, and combinations thereof. Useful polyester staple fibers include, but are not limited to, crimped polyethylene terephthalate (PET) staple fibers.

The second crimped staple fibers are bicomponent fibers having at least two materials of different heat stability. The heat stability of the relatively lower heat stable material of the second crimped, staple, organic thermoplastic fiber is less than the heat stability of the first crimped fiber. For purposes of this embodiment, the term "bicomponent" fiber is meant to describe the second crimped staple fibers, although it will be understood that the term encompasses fibers having more than two components of differing heat stability.

Useful bicomponent fibers often have a lower heat stable component made of polypropylene or other low-melting polymer (e.g., a low heat stability polyester), as long as the temperature at which the lower heat stable component of the bicomponent fiber melts and adheres to the other fibers in the nonwoven web construction at a temperature lower than the melting or degradation temperature of the first crimped fibers or the second component of the bicomponent fibers. Suitable bicomponent fibers must be activatable at elevated temperatures below the temperature(s) that would adversely affect the crimped first fibers.

Examples of useful first components of the bicomponent fibers include polyesters (e.g., polyethylene terephthalate, polyphenylene sulfides); polyamides (e.g., nylon); polyimides (e.g., polyetherimide); polyolefins (e.g., polypropylene); and combinations thereof.

In some embodiments, the second component of the bicomponent fibers includes a blend that includes at least one polymer that is at least partially crystalline and at least one amorphous polymer, where the blend has a melting temperature of at least 30° C. below the melting temperature of the first component. Additionally, a useful melting temperature of the second component is at least 130° C. in order to avoid excessive softening resulting from the processing conditions to which the fibers will be exposed during the formation of nonwoven webs therefrom. These processing conditions typically involve temperatures in the area of 140° C. to 150° C. Fibers exhibiting these characteristics include polyesters, polyolefins, and polyamides. The ratio of crystalline to amorphous polymer has an effect both on the degree of shrinkage of nonwoven webs containing the melt-bondable fibers and the degree of bonding between first and second components of the melt-bondable fibers. A suitable ratio of amorphous to partially crystalline polymer is from about 15:85 to about 90:10.

As used herein the term "amorphous polymer" refers to a melt extrudable polymer that, during melting, does not exhibit a definite first order transition temperature, i.e., melting temperature. The polymers forming the second component are compatible or capable of being rendered compatible. As used herein the term "compatible" refers to a blend wherein the components exist in a single phase. The second component is capable of adhering to the first component. Useful blends of polymers that include the second component include, but are not limited to, crystalline and amorphous polymers of the same general polymeric type, such as polyester. Materials suitable for use as the second component include polyesters, polyolefins, and polyamides.

The first and second components of the bicomponent fibers may be of the same or different polymer types, such as, for example, polyester and polyamide.

Useful low-density, lofty, open, nonwoven webs made of first and second crimped, staple, organic thermoplastic fibers include no greater than about 50% by weight or even from about 20 to about 40% by weight bicomponent fibers.

In some embodiments, the bicomponent fibers have a concentric core and a sheath, have been stuffer box crimped with from about 6 crimps to about 12 crimps per 25 mm, have a cut staple length from about 25 mm to about 100 mm, and have a tenacity of about 2 g/denier to about 3 g/denier. Other useful bicomponent fibers have a side-by-side construction or an eccentric core and sheath construction. Examples of suitable bicomponent fibers are described in U.S. Pat. No. 5,082,720, which is incorporated herein by reference.

Useful crimped staple fibers include reverse helical crimp fibers, coiled crimped fibers and combinations thereof. Useful helically crimped fibers have from about 1 to about 15 full cycle crimps per 25 mm fiber length, while stuffer box crimped fibers have about 3 to about 15 full cycle crimps per 25 mm fiber length.

Crimp index, which is a measure of fiber elasticity, can range from about 35 to about 70 percent for helically crimped fibers, which is about the same as stuffer box crimped fibers. Crimp index can be determined by measuring the fiber length when fully extended ("extended length"), measuring the fiber length when the fiber is relaxed ("relaxed length"), then subtracting the relaxed length from the extended length, and then dividing the resulting value by the extended length and multiplying that value by 100. (The values of the appropriate load used to stretch the fiber depend on the fiber denier. For fibers of the invention having 50-100 denier, a load of about 0.1-0.2 gram may be used, while a load of about 5-10 grams is used for higher denier fibers.) The variation in crimp index with heating can also be determined by exposing the fibers to an elevated temperature, e.g., 135° C. to 175° C., for 5 to 15 minutes, computing the crimp index, and this value compared with the crimp index before heat exposure. Crimp index measured after the fiber is exposed for 5 to 15 minutes to an elevated temperature should not significantly change from that measured before the heat exposure.

Crimped staple fibers can be formed using a variety of techniques including, but not limited to, stuffer-box crimped, gear crimped, helically crimped (as described, for example, in U.S. Pat. No. 4,893,439), and combinations thereof. Useful methods of manufacturing helically crimped bicomponent fibers (including, but not limited to, polyester fibers) are described in U.S. Pat. Nos. 3,595,738, 3,868,749, 3,619,874, and 2,931,089 all of which are incorporated herein.

Crimped staple fibers can be processed and entangled into nonwoven webs by conventional web-forming machines including, but not limited to, machines available under the trade designation RANDO-WEBBER from Curlator Corporation. Methods useful for making nonwoven webs from crimped, staple, synthetic fibers are disclosed by Hoover, et al., in U.S. Pat. Nos. 2,958,593 and 3,537,121, which are incorporated herein by reference.

The length of the fibers employed in the web-forming operation is dependent upon the limitations of the processing equipment with which the nonwoven open web is formed. However, depending on types of equipment, fibers of different lengths, and combinations thereof, very likely can be utilized in forming the lofty open webs of the desired ultimate characteristics specified herein. Suitable helically crimped fibers have a length from about 60 mm to about 150 mm and suitable stuffer box fibers have a length from about 25 mm to about 70 mm.

Suitable fibers have a denier (i.e., a weight in grams of a fiber 9000 meters in length) of from about 6 to about 400, from about 6 to about 200, or even from about 15 to about 70.

In some embodiments, the lofty, open, nonwoven webs made of first and second crimped, staple, organic thermoplastic fibers have a non-compressed thickness of at least about 0.5 cm or even from about 2 cm to about 4 cm. In some embodiments, the lofty, open, nonwoven web made of first and second crimped, staple, organic thermoplastic fibers has a thickness of at least 5 mm, at least about 20 mm or even at least about 50 mm, and a basis weight of at least about 0.2 kg/m$^2$, at least about 0.3 kg/m$^2$ or even at least about 0.5 kg/m$^2$.

Binder Compositions

Binders suitable for use in the lofty, open, nonwoven web made of first and second crimped, staple, organic thermoplastic fibers include any thermoplastic or thermoset resin suitable for manufacture of nonwoven webs and which, in its final, cured state is compatible (or capable of being rendered compatible) with the fibers of choice. Useful cured resins adhere to all of the types of fibers in a particular nonwoven web. Suitable cured resins may also adhere to the optionally abrasive particles. In some embodiments, the cured resin is soft enough to allow the nonwoven web to be somewhat flexible.

Useful binder resins include, but are not limited to, synthetic polymers such as styrene-butadiene (SBR) copolymers, carboxylated-SBR copolymers, melamine resins, phenol-aldehyde resins, polyesters, polyamides, polyureas, polyvinylidene chloride, polyvinyl chloride, acrylic acid-methylmethacrylate copolymers, acetal copolymers, polyurethanes, and mixtures and cross-linked versions thereof. One useful group of binder resins is phenol-aldehyde resins, which include the reaction product of a phenol derivative and an aldehyde. As used herein the term "phenol derivative" is meant to include phenol, alkyl-substituted phenols, including cresols, xylenols, p-tert-butyl-phenol, p-phenyl-phenol, and nonylphenol. Diphenols include, but are not limited to, resorcinol (1,3-benzenediol) and bisphenol-A (bis-A or 2,2-bis(4-hydroxyphenyl)propane), are employed in smaller quantities for applications requiring special properties.

Aldehydes useful in forming phenol-aldehyde resins include, but are not limited to, cyclic, straight and branched chain alkyl aldehydes, and aromatic aldehydes. In some embodiments, the aldehydes have molecular weight less than about 300. Examples of suitable aldehydes include formaldehyde, benzaldehyde, propanal, hexanal, cyclohexane carboxaldehyde, acetaldehyde, butyraldehyde, valeraldehyde, and other low molecular weight aldehydes.

Nonwoven Web III

Another class of suitable nonwoven webs includes lofty open webs that include inter-engaged continuous crinkled coarse filaments of a resilient thermoplastic polymer are disclosed in U.S. Pat. Nos. 3,837,988 and 4,227,350, which are incorporated herein by reference. The inter-engaged continuous crinkled coarse filaments of a resilient thermoplastic polymer of the web are removably welded together at points of mutual contact to form a handleably integrated structure at least one major surface of which is flattened and the portion of the web immediately adjacent the surface includes a higher concentration (i.e., density) of filament than the inner portion of the web and presents a greater contact area relative to the opposite unflattened surface, and an organic binder bonded to at least a portion of the filaments. The web of inter-engaged continuous crinkled coarse filaments can be prepared by extruding or melt-spinning a molten polymer in the form of a bundle of free-flowing thick filaments that progresses vertically downwardly into glancing contact with a contact surface of a smooth plate or roll and into a quench bath. The contact surface is maintained just above the surface of the quench bath so that filaments making glancing contact with it will thereafter fall into the quench bath. The filament bundle is aligned to permit some of the outer filaments to make such contact with the contacting surface and the remaining filaments in the bundle to fall directly into the quench bath, thereby providing differential quenching, which imparts unique structural properties to the web. The filaments are continuously withdrawn through the liquid cooling medium of the quench bath in a path that diverges from the vertical direction of melt-spinning. The point at which the direction of withdrawal of filaments diverges from the vertical direction is located in a zone extending from about the surface of the bath to a distance below the surface. The web is advanced at a slower rate of speed than the extrusion rate causing the quenched portion of the bundle to continuously support the incoming portion. As a result there is produced a filamentous web having a flattened surface and a highly expanded lofty open structure. Adjacent surfaces of the inter-engaged filaments are effectively bonded during the process.

Useful polymers for forming the web of inter-engaged continuous crinkled filaments include, but are not limited to, polycarbonate; polyalkylene; polyester; polyvinyl; polyamide; ionomer; polyethylene, polypropylene, polyvinyl acetate or copolymers thereof; and other resins that are extrudable at elevated temperatures in the form of soft flexible continuous filaments and that have the required stiffness, toughness and other required physical and chemical characteristics at lower temperatures to permit cohesion of the filaments. The polymers can optionally include plasticizer or softener and other additives including, but not limited to, coloring agents, fibrous reinforcing agents, non-fibrous reinforcing agents, stabilizers, fillers and combinations thereof.

The resulting web can be treated with a variety of agents including, but not limited to, with solutions of resins, suspensions of resins, bonding agents, and coating agents, by dyeing or metallizing the filaments, or by further addition of particulate materials such as abrasive grains, metal flakes, fibrous flock, and ground cork, by embossing, skiving, shearing, laminating, partial fusing and other physical treatments, and combinations thereof. A plastic screen or film can be bonded to the contact surface of the mat such that it becomes lightly bonded to the contacting layer of filaments to form a laminate structure. Where the plastic screen or film is impermeable, the plastic screen or film can function as the second layer of the sound insulation construction.

The web can include filaments having a variety of diameters including, but not limited to, from about 5 mils to about 125 mils (about 0.1 mm to about 3 mm), from about 15 mils to about 35 mils (about 0.4 to about 0.9 mm). Fibers having a diameter of from about 15 mils to about 35 mils provide a high degree of resilience and crush resistance together with excellent mechanical strength. In some embodiments, the webs of inter-engaged continuous crinkled filaments have a thickness of at least about 5 mm, at least about 12 mm or even at least about 20 mm.

Examples of suitable inter-engaged continuous crinkled filament webs and methods of making the same are disclosed in U.S. Pat. Nos. 3,837,988 and 4,227,350, which are incorporated herein by reference.

Nonwoven Web IV

Other useful classes of nonwoven webs include sponge-like, compressible, nonwoven webs that include randomly intermingled and randomly bonded hydrophobic fibers, examples of which include those webs that are described in U.S. Pat. Nos. 3,537,121 and 3,910,284, both of which are incorporated herein by reference. Throughout the web the randomly intermingled fibers are bonded together either through fusion or with a binder at randomly spaced points where the fibers cross. The fibers of the web define, in effect, walls of a large multiplicity of open cells, which impart a high void volume to the web.

The fibers can be made from any suitable polymer including, but not limited to, polyethylene terephthalate (e.g., oriented polyethylene terephthalate), nylon-6, nylon-6,6, polyolefin (e.g., polyethylene and polypropylene), and combinations thereof. The web can also include other fibers including, but not limited to, rayon, polybutylene terephthalate, 4-methylpentene copolymer, and other polyamide fibers, and combinations thereof. Useful fibers have a diameter of no greater than about 75 microns ($\mu$m), from about 10 $\mu$m to about 50 $\mu$m, or even from about 20 $\mu$m to about 40 $\mu$m, and a length of at least about 3 cm, at least about 3.8 cm, no greater than about 8 cm, no greater than about 7 cm or even from about 3.5 cm to about 5 cm.

The binder includes a soft (e.g., a resin having a Knoop hardness of less than 3), flexible, tough, resilient and somewhat elastomeric resin and a soft mineral filler. One example of a useful binder is flexible polyurethane. The soft mineral filler may be present in the binder in an amount of from about 10% by volume to about 65% by volume, from about 15% by volume to about 50% by volume or even about 33% by volume, is finely divided, and has a Knoop hardness of no greater than about 150. Suitable fillers include, but are not limited to, calcium carbonate, kaolin, talc and combinations thereof.

Useful sponge-like, compressible, nonwoven webs have a thickness of at least about 2 cm, at least about 2.5 cm or even at least about 3 cm and a density less than about 40 kg/m$^3$, less than about 30 kg/m$^3$ or even less than about 20 kg/m$^3$ and a solidity no greater than about 0.02 or even no greater than about 0.01. Useful examples of methods of making sponge-like, compressible, nonwoven webs are disclosed in U.S. Pat. No. 3,537,121 (including Examples 1-7 thereof) and U.S. Pat. No. 3,910,284, both of which are incorporated herein.

The Second Layer

The second layer of the sound insulation construction can have an airflow resistance greater than 10,000 Rayls/m, greater than about 100,000 Rayls/m, greater than about 1,000,000 Rayls/m, greater than about 10,000,000 Rayls/m or even greater than about 100,000,000 Rayls/m, and can be air permeable or air impermeable. When the second layer is air permeable, the sound insulation construction can be tuned to create the optimum airflow resistance in order to maximize the overall acoustic absorption of the sound insulation construction or tuned for a maximum absorption in a specific sound frequency range. Tuning can be achieved by selecting a combination of a first layer and a second layer that achieves the desired absorption characteristics. When the second layer is air permeable, the sound insulation construction can function as an absorber-decoupler. If the second layer possesses a sufficiently high surface density (e.g., at least about 2 kg/m$^2$ for automotive applications) and is air impermeable, it can function as a barrier and the sound insulation construction can function as a barrier-decoupler. If the second layer is sufficiently thin and air impermeable, in some embodiments the sound insulation construction can function as an absorber.

Components often found in vehicles are well suited for use as the second layer. Useful second layers include, but are not limited to, floor coverings (e.g., carpet), trunk liners, hood liners, engine compartment covers, engine compartment liners, fender liners, wheelhouse liners, facings, dash liners, side panels (e.g., doors), spare tire covers, package tray trim, pillar trim, door liners, rear gate liners, and components thereof, and combinations thereof, all of which can be either air permeable or air impermeable. The term "facing" is used to refer to the exterior decorative layer visible from the interior of the vehicle. Such facings are located on the interior surfaces of the vehicle including, but not limited to, the dashboard, side panels, rear gate, ceilings (e.g., headliner), and trunks (e.g., trunk liner).

The second layer can have any suitable thickness and be in any suitable form including, but not limited to, films, multilayer films, film laminates, bicomponent films, foils, fibrous materials, foams (e.g., open cell foams and closed cell foams) and combinations thereof. Useful fibrous materials include, but are not limited to, woven and nonwoven webs, mats, batts, tufted and piled substrates (e.g., carpeting). Useful nonwoven webs include, but are not limited to, spunbond, melt blown, spunbond-meltblown, air laid, wet laid, scrim, needle punched, and coiled fiber webs, and combinations thereof. Useful woven webs include, but are not limited to, fabrics, knits and weaves. Useful films include, but are not limited to, continuous films, perforated films, and combinations thereof. Useful foils are made from a variety of metal coated films including, but not limited to, aluminum coated films and copper coated films. In some embodiments, the metal coatings have a thickness no greater than about 800 angstroms.

Use

The sound insulation construction can be used in a variety of applications, including, but not limited to, vehicles, appliances, machinery, equipment, and the like. For example, suitable vehicle locations include, but are not limited to, engine compartments, fire walls, fender wells, doors, floor panels, storage bins, trunks, wheelhouses, dash panel, side panels (e.g., doors), ceilings, spare tire compartments, pillars, rear gates, and combinations thereof. In some embodiments, at least one layer of the sound insulation construction is used in a method of insulating sound where the method includes coupling a first layer as described herein to a metal layer (e.g., the surface of a metal body of a vehicle, a surface in the flooring or ceiling of a vehicle, etc.) In some embodiments, the method further includes coupling a second layer as described herein to the first layer. For example, in some embodiments, the first layer includes an air permeable, bonded fiber nonwoven web that exhibits a work of compression of at least 0.7 kJ/m$^3$ and an airflow resistance no greater than 10,000 Rayls/m, and is coupled to the second layer, which exhibits an airflow resistance greater than 10,000 Rayls/m.

In some embodiments, the method further includes coupling at least one of the first and second layers of a sound insulation construction to one or more additional layers. The additional layer(s) can include a component of a vehicle or a portion thereof, including, but not limited to, floor covering, trunk liner, hood liner, engine compartment cover, engine compartment liner, fire wall, fender liner, wheelhouse liner, facing, dash liner, side panel, spare tire cover, package tray trim, pillar trim, door liner, rear gate liner, and combinations thereof. For example, additional layers can include, but are not limited to, metals, mastics (e.g., a composition that includes asphalt, tar, bitumen or a combination thereof), foam, chopped fiberglass, fabric, film, and combinations thereof.

The sound insulation construction can be coupled to a surface of a vehicle including, but not limited to, interior and exterior surfaces of a vehicle and surfaces of components of a vehicle, between various components of a vehicle, and combinations thereof. The sound insulation construction can also be part of a multilayer construction that functions to acoustically insulate a source from a receiver. Such multilayer constructions optionally include multiple sound insulation constructions and additional layers. The additional layers can also exhibit a variety of properties allowing them to provide a variety of functions including, but not limited to, absorber, absorber-decoupler, decoupler, damper, barrier-decoupler, and combinations thereof.

The layers of the sound insulation construction, as well as any additional layers or components, to which the sound insulation construction is coupled, can be coupled together using any suitable mechanism including, but not limited to, direct contact, external force, adhesive, cohesive, melt bonding, extrusion bonding, sonic welding, magnets, mechanical mechanisms (e.g., nuts, bolts, rivets, screws, staples, nails, hook and loop fasteners, snap-fit engagement mechanisms, press-fit engagement mechanisms), and combinations thereof), and combinations thereof.

Figure 2A:
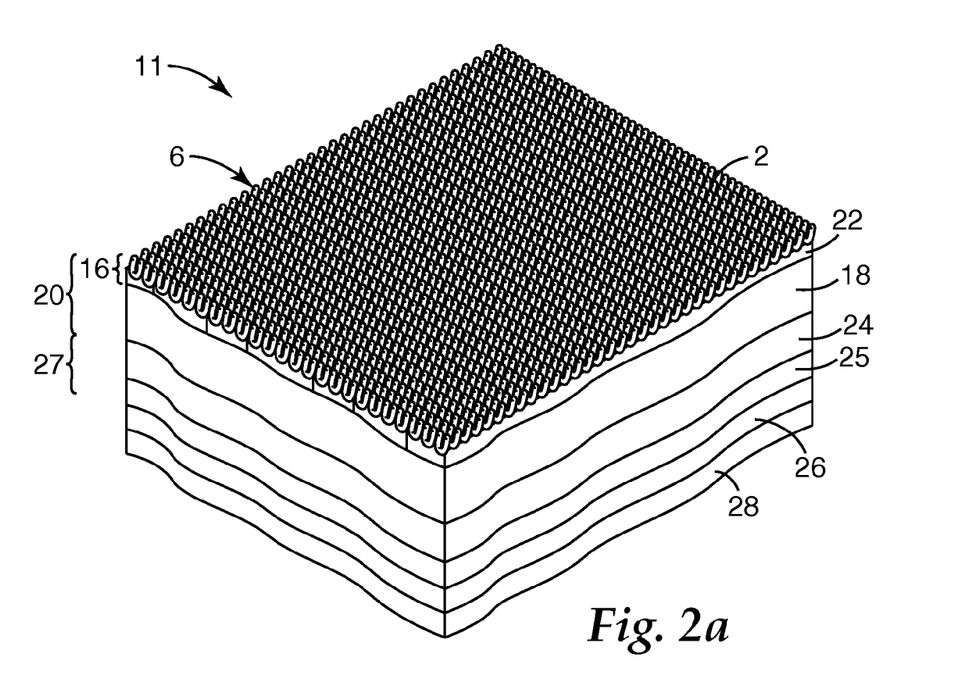
FIG. 2a illustrates a schematic perspective view of a multilayer construction in the form of a carpet laminate according to one embodiment of the present invention, the multilayer construction including a sound insulation construction and being coupled to a vehicle.
Figure 2B:
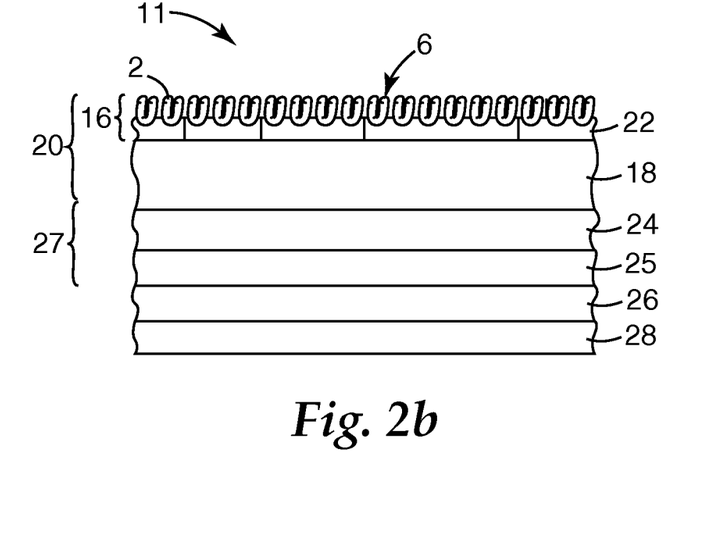
FIG. 2b is a schematic cross-sectional view of the multilayer construction of FIG. 2.

As a result, the sound insulation construction of the present invention can be used in a variety of applications and coupled to a variety of additional layers, components, and combinations thereof to achieve the desired type and amount of sound insulation. FIG. 2 illustrates a multilayer construction 11 that includes a sound insulation construction 20. The multilayer construction 11 of the embodiment illustrated in FIG. 2 is designed to be used in the floor of a vehicle to absorb sound emanating from the interior of the vehicle and to insulate the interior of the vehicle from the exterior of the vehicle. In addition to the sound insulation construction 20, the multilayer construction 11 includes additional layers (designated by reference numerals 24, 25 and 26 and are described in greater detail below) which are formed of appropriate materials having properties that allow the multilayer construction to be used in the floor of the vehicle.

The sound insulation construction 20 includes a first layer 18 of air permeable, bonded fiber nonwoven web coupled to a second layer 16, which is in the form of an air permeable carpet laminate. The carpet laminate of the second layer 16 includes an exposed fibrous surface 6 formed by fibers 2 (e.g., sheared loop fibers or non-sheared loop fibers) tufted into a supporting layer 22 (i.e., a backing). The supporting layer 22 includes a thermoplastic material that substantially locks the fibers 2 in place.

The sound insulation construction 20 is coupled to a barrier layer 24 having a sufficient surface density (e.g., at least about 2 kg/m$^2$) to provide a barrier to sound transmitted from the vehicle exterior through the floor of the vehicle. One example of a suitable barrier layer 24 is a barium sulfate-calcium carbonate-compounded ethylene vinyl acetate (EVA), (e.g., barium sulfate (40%)-calcium carbonate (40%)-compounded EVA (20%), available under the trade designation of KELDAX, from DuPont Corporation).

The barrier layer 24 is coupled to a decoupler layer 25, which is used to decouple the barrier layer 24 from the vehicle, particularly, a sheet metal layer 28 forming at least a portion of the vehicle. The decoupler layer 25 can be formed of one or more of a first layer as described herein, foam (e.g., open or closed-cell), and combinations thereof.

The decoupler layer 25 is optionally coupled to a mastic layer 26. The mastic layer 26 can be formed of one or more of asphalt, tar, bitumen, and combinations thereof.

As a result, the barrier layer 24, the decoupler layer 25, and the mastic layer 26 comprise additional layers of the multilayer construction 11. The multilayer construction 11 is coupled to the sheet metal layer 28. The multilayer construction 11 can be coupled to a variety of components, and surfaces thereof, of the vehicle, as described above. The sheet metal layer 28 is shown in FIG. 2 by way of example only, but it should be understood that the multilayer construction 11 can be coupled to other layers or components of the vehicle. The sound insulation construction 20 of FIG. 2 functions to absorb sound within the interior of the vehicle.

In some embodiments, as illustrated in FIG. 2, the decoupler layer 25 is a first layer as described herein, particularly, an air permeable, bonded fiber nonwoven web, and the barrier layer 24 and the decoupler layer 25 form the second and first layers, respectively, of a second sound insulation construction 27 that functions as a barrier-decoupler relative to sound emanating from the exterior of the vehicle. As a result, the multilayer construction 11 includes a first sound insulation construction 20 and a second sound insulation construction 27, the first and second sound insulation constructions 20, 27 being representative of two exemplary embodiments of sound insulation constructions of the present invention.

In some embodiments, the second layer 16 is a mass back carpeting having a relatively thick elastomeric backing material that is air impermeable. In such embodiments, the sound insulation construction 20 functions as a barrier-decoupler and is coupled to the sheet metal layer 28 via an optional mastic layer 26 (i.e., without the barrier layer 24 and the decoupler layer 25).

Figure 3:
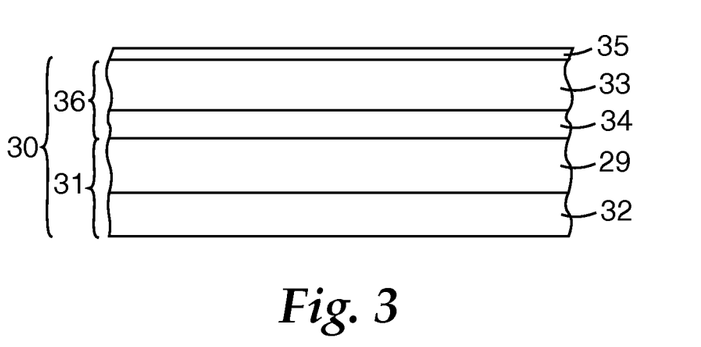
FIG. 3 illustrates a schematic cross-sectional view of a multilayer construction in the form of a headliner according to another embodiment of the present invention, the multilayer construction including a sound insulation construction and being coupled to a vehicle.

FIG. 3 illustrates a multilayer construction 30 in the form of a headliner that includes a sound insulation construction 31. The multilayer construction 30 is coupled to the ceiling 35 of a vehicle. The sound insulation construction 31 includes a first layer 29 coupled to a second layer 32. The first layer 29 is also coupled to additional layers 33 and 34, which form the remainder of the multilayer construction 30. The additional layers 33, 34 are coupled to the ceiling 35 (e.g., a sheet metal layer or a metal frame) of the vehicle. Headliner constructions often include multiple layers including, but not limited to, a barrier film, a chopped fiberglass layer, urethane impregnated open cell foam layer, a second chopped fiberglass layer, an optional barrier layer (e.g., film), a decorative foam layer, and a final fabric layer (i.e., the headliner fabric), which is exposed to the interior of the vehicle. The final fabric layer of the headliner is often referred to as a "headliner facing." In the embodiment illustrated in FIG. 3, the second layer 32 is in the form of a headliner facing. In embodiments in which the second layer 32 is air permeable and exhibits sufficient airflow resistance for a given frequency range, the sound insulation construction 31 can function as an absorber for that given frequency range.

In some embodiments, the second layer 32 can further include (i.e., in addition to the headliner fabric) an air permeable foam (e.g., open cell foam) layer positioned adjacent the first layer 29, provided that the combination of the headliner facing and the air permeable foam exhibit a sufficient airflow resistance for the frequency range of interest.

Figure 4:
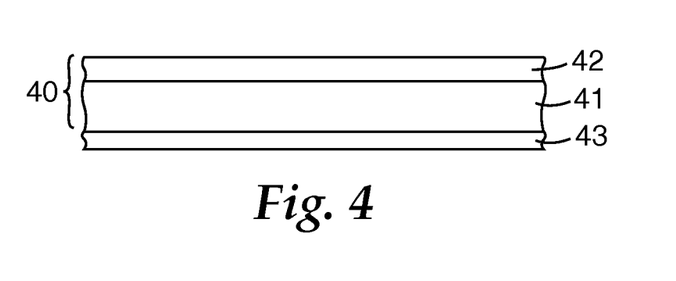
FIG. 4 illustrates a schematic cross-sectional view of a sound insulation construction according to another embodiment of the present invention, the sound insulation construction forming a trunk liner and being coupled to a vehicle.

FIG. 4 illustrates a sound insulation construction 40 in the form of a trunk liner having a first layer 41 coupled to a second layer 42. The first layer 41 is coupled to a component 43 of a vehicle (e.g., a metal frame) that at least partially forms the interior surface of the trunk of the vehicle. The second layer 42 is in the form of a trunk liner facing. In some embodiments, the second layer 42 is air impermeable and is of sufficient surface density such that the sound insulation construction 40 functions as a barrier-decoupler. In some embodiments, the second layer 42 is air permeable and is of sufficient airflow resistance that the sound insulation construction 40 functions as an absorber for a desired frequency range.

Figure 5:
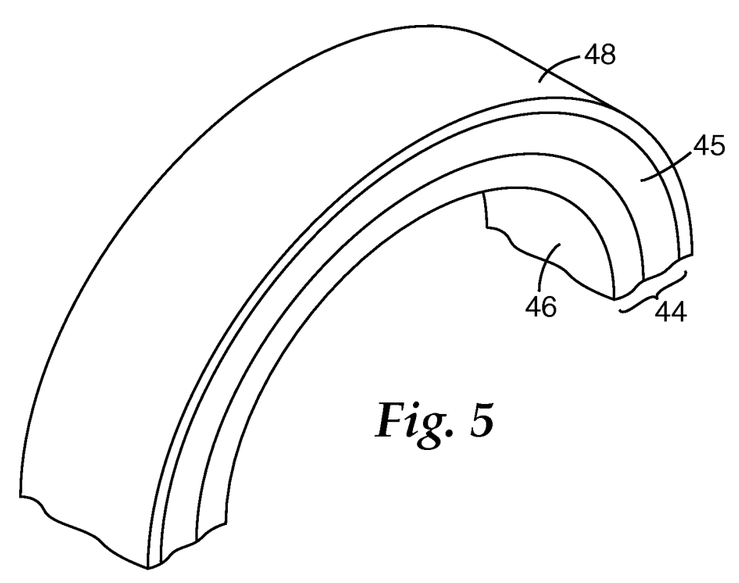
FIG. 5 illustrates a schematic perspective view of a sound insulation construction according to another embodiment of the present invention, the sound insulation construction forming a wheel well liner and being coupled to a wheel well of a vehicle.

FIG. 5 illustrates a sound insulation construction 44 in the form of a wheel well liner having a first layer 45 coupled to a second layer 46, the second layer 46 being in the form of an air impermeable web. The first layer 45 is coupled to a component 48 of a vehicle (e.g., a metal frame), which at least partially forms the exterior surface of a wheel well of the vehicle. The second layer 46 is in the form of an outwardly facing layer of a wheel well liner. The second layer 46 has a sufficient surface density (i.e., the surface density necessary to achieve the desired transmission loss) such that the sound insulation construction 44 functions as a barrier-decoupler.

Figure 6:
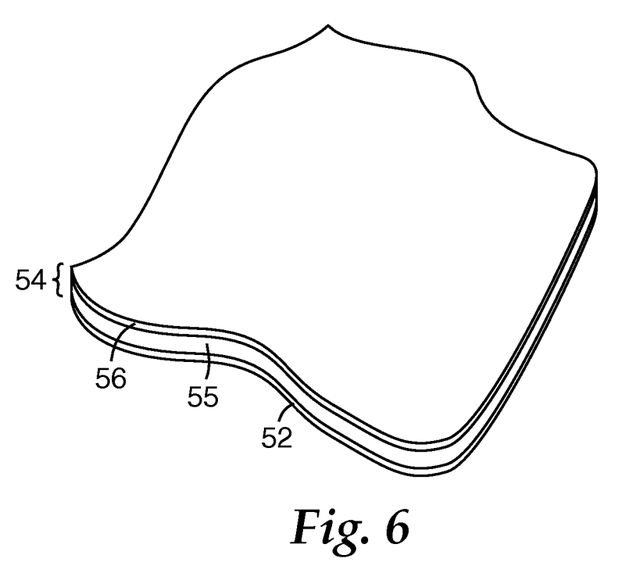
FIG. 6 illustrates a schematic perspective view of a sound insulation construction according to another embodiment of the present invention, the sound insulation construction being coupled to an engine cover of a vehicle.

FIG. 6 illustrates a sound insulation construction 54 coupled to an engine facing plastic layer 52 of an engine cover of a vehicle. The sound insulation construction 54 includes a first layer 55 coupled to a second layer 56, the second layer 56 being in the form of a thin air impermeable film. The second layer 56 is in the form of an outwardly facing layer of the engine cover. In some embodiments, the film of the second layer 56 is sufficiently thin (e.g., less than about 0.1 mm) such that the sound insulation construction 54 functions as an absorber for a given frequency range.

Although the sound insulation construction has been described above with respect to its use in vehicles and as being coupled to at least surface of a vehicle or a component of a vehicle, one of ordinary skill in the art should understand that the sound insulation construction can be used in a variety of structures and coupled to various surfaces (e.g., interior and exterior surfaces) of those structures. Such structures include, but are not limited to, laboratory equipment (e.g., centrifuges, stirrers, shakers, etc.), medical equipment (e.g., magnetic resonance imaging machines, cathode ray tube imaging machines, etc.), appliances (e.g., washing machines, dryers, dishwashers, refrigerators, freezers, air conditioners, furnaces, computers, etc.), power tools (e.g. electric drills, saws, sanders, etc.), and architectural structures, including HVAC duct liners, and walls, floors, and ceilings of a variety of rooms (e.g., computer rooms, sound rooms, etc.) of buildings (e.g., commercial buildings, residential buildings, etc.), and a variety of other apparatuses, devices or structures that produce or transmit sound, vibration or a combination thereof.

The following working examples illustrate various features and aspects of the present invention and are intended to be illustrative and not limiting.

EXAMPLES

Test Procedures

Test procedures used in the examples include the following.

Maximum Acceleration Test Method

Figure 7:
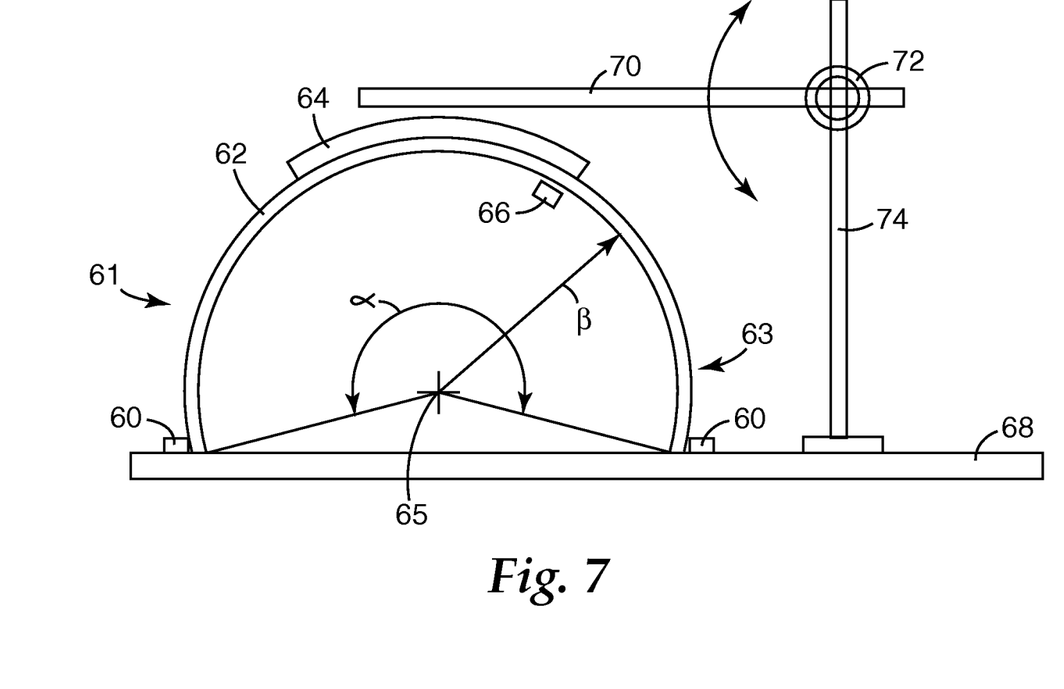
FIG. 7 is a schematic cross-sectional view of an apparatus used to perform a Maximum Acceleration Test described in the Test Procedures and Examples 1-3 and Comparative Example C1-C4.

A test apparatus for evaluating energy transmission and damping properties is constructed as shown in FIG. 7. The apparatus consists of a resonating body 62, support base 68, accelerometer 66, and striking anvil 70 with various support elements. The resonating body 62 is formed of a 1.58 mm thick sheet of aluminum (type 5052) into a semi-circular body of arch angle α of 210 degrees and radius β of 12.6 cm as defined by the center of a corresponding circle 65. The resonating body 62 has a length of 31 cm and is placed onto a 9 mm thick, 41 cm by 47 cm, plywood base 68. The resonating body 62 is held in position, but not attached to, the plywood base 68 with three plastic washers 60 that are evenly spaced on each side of the body 62 at the front, back, and middle of the body 62. The resonating body 62 is centered, front to back, 5 cm from the front and back edges of the plywood base 68; and on a first side 61 2.2 cm from the edge of the plywood base 68 and on the second side 63 19.6 cm from the opposite edge of the plywood base 68. A Model 726 accelerometer 66 (Wilcoxon Research, Gaithersburg, Md.) is attached to the inner wall of the resonating body 62 at a point 6 cm from the front of the body 62 and 90 degrees along the inside arc, as measured from the base of the second side 63 of the resonating body 62. An anvil 70 is positioned to strike the resonating body 62 at a point on the top crest of the resonating body 62 at a point midway between along the length of the resonating body 62. The anvil 70 is a 23.8 cm long steel rod having a diameter of 12.8 mm that can freely rotate about a pivot 72. The anvil 70, which was oriented perpendicular to the length of the resonating body 62, extended 22.7 cm from the pivot point 72. With the anvil held horizontally, the gap between the anvil 70 and resonating body 62 is 2.0 cm. A support stand 74 is attached to the plywood base 68 to support and position the pivot 72 and anvil 70.

Acceleration is determined by centering a 6.3 cm by 7.6 cm test sample 64 that has been conditioned to a temperature of 23° C., on top of the resonating body 62 at a point under the striking anvil 70. The striking anvil 70 is then rotated up so that a gap of 5.715 cm between the exposed surface of the test sample 64 and the bottom of the striking anvil 70 is established. The striking anvil 70 is then allowed to freely rotate about the pivot 72 and strike the test sample 64. The acceleration wave that results from the impact is sensed by the accelerometer 66 and recorded by an FFT Analyzer, Hewlett Packard Model 35670 (Hewlett Packard, Palo Alto, Calif.). The maximum acceleration is obtained and reported in units of gravities (g).

Work of Compression Test Method

Compressive stress-strain values (plotted as compressive stress, ordinate, against corresponding values of compressive strain, abscissa) are measured using a Model 5544 INSTRON™ universal testing machine (Instron Corp., Canton, Mass.) fitted with a 2 kN load cell, a 7.62 cm jaw gap, and operating at a x-head speed of 30 cm/min. Rectangular 2.54 cm×17.8 cm test samples are evaluated to determine the force (kPa) and compression (% strain) through a range of compression. The area under the compressive stress-strain plot between zero kPa and 10 kPa is determined and reported as the Work of Compression (kJ/m³). The Work of Compression parameter, an indicator of the energy absorbing qualities of a material, is calculated as follows:

$$w = \int_0^\delta F\,d\delta$$

$w \equiv$ work $F \equiv$ compression force $\delta \equiv$ displacement

If $\delta$ is expressed in terms of axial strain ($\delta = L\epsilon$) with L the thickness of material and $\epsilon$ (m/m) the compressive strain; and F is expressed in terms of axial stress ($P=A\sigma$) with A the compressed area of a sample and $\sigma$ (kPa or kN/m²) the stress then:

$$w = \int_0^\epsilon \sigma A L\,d\epsilon = AL\int_0^\epsilon \sigma\,d\epsilon$$

and:

$$W = w/AL = \int_0^\epsilon \sigma\,d\epsilon\,(kNm/m^3)$$

where:

$\int_0^\epsilon \sigma\,d\epsilon \equiv$ Area under stress − strain curve $W \equiv$ Work of compression $(kJ/m^3)$ Note: $J \equiv N \cdot m$ Damping Loss Factor Damping loss factor is determined using a Polytec laser vibrometer system, (Polytec Inc., Tustin, Calif.) to measure the acceleration response of an aluminum plate excited by an MB Dynamics model Modal 50A shaker (MB Dynamics Inc., Cleveland, Ohio). The aluminum plate is 30.5 cm×45.7 cm and 0.61 mm thick and is suspended vertically by strings from holes in the upper two corners of the plate. The suspension points are located 2.7 mm from top, 30.5 cm wide edge of the plate, and 2.5 cm from the side, 45.7 cm wide edge of the plate. The Polytec laser vibrometer system consists of a model OFV 055 optical scanning head, a model OFV 3001 S Vibration Controller, and a Windows computer that runs the Polytec PSV version 8.3 software. A PCB model 208A04 load cell (PCB Piezotronics Inc., Depew, N.Y.) is mounted between the plate and the stinger of the shaker to measure the input force. The acceleration response is taken very near the shaker excitation drive point. The drive point location is approximately 8.3 cm from the long edge of the plate and 5.3 cm from the short edge of the aluminum plate. The Polytec PSV software serves as both frequency analyzer and signal generator. The H1 frequency response function of acceleration output and force input is calculated by the Polytec system. The Polytec PSV software is configured to perform a zoom analysis from 820 Hz to 920 Hz with 6400 lines of resolution. The signal generator is configured to drive the shaker using periodic chirp excitation. Three frequency response functions are collected and averaged for each test configuration. The half power point method is used to calculate the damping loss factor for the two modes.

Test samples, 30.5 cm×30.5 cm, and are taped to the surface of the aluminum plate (i.e., the surface of the aluminum plate opposing the laser scan) with pressure sensitive adhesive tape. Samples are centered between the two short edges of the test plate. Two 30.5 cm strips of tape hold the samples onto the plate, one each on the top and bottom of the sample edges. Approximately half the tape width, or 2.5 cm, is adhered to the metal surface on each edge.

The half power point calculation from a frequency response function is determined as outlined in Shock and Vibration Handbook, C. M Harris and C. E. Crede, 2nd Edition, McGraw Hill Inc, p 2-15, where the loss factor η (dimensionless) for Δω, the frequency increment at the half-power point, is given as:

$$\eta = \Delta\omega/\omega$$

where
η=Loss Factor
Δω=Frequency Increment (Hz)
ω=Resonant Frequency (Hz)

Sound Absorption Performance

Sound absorption performance is determined in accordance with ASTM E-1050 using a mid-size impedance tube. Values of absorption are reported as a percent of the emitted sound for specific frequencies (Hz).

Web Solidity

Web solidity is determined by dividing the bulk density of a web specimen by the density of the materials making up the web. Bulk density of a web specimen is determined by first measuring the weight and thickness of a 10-cm-by-10-cm section of web.

Thickness

Thickness of the specimen is evaluated as prescribed in the ASTM D 5736 standard test method, modified by using a mass of 130.6 grams to exert 13.8 Pa (13.8 N/m²) onto the face of each sample. When the size of the sample is limited to something less than the size recommended in ASTM D 5736 the mass on the pressure foot is proportionately reduced to maintain a loading force of 13.8 Pa (13.8 N/m²). The specimens are first preconditioned at 22+/−5° C. and in an atmosphere of 50%+/−5% relative humidity and results reported in centimeters.

Basis Weight

The basis weight of a specimen is obtained by dividing the weight of the specimen in grams by the sample area in square centimeters. Basis weight is reported in g/cm².

Bulk Density

The bulk density of the web is determined by dividing the basis weight of a specimen by the thickness of the specimen and is reported as g/cm³.

Web solidity is determined by dividing the bulk density of the web by the density, in g/cm³, of the material(s) from which the web was produced. The density of the polymer or polymer components can be measured by standard means if the supplier does not specify material density. Solidity is reported as a dimensionless fraction of the percent solids content of a given specimen and is calculated as follows:

$$S = \rho_{web}/\rho_{material} \times 100\%$$

Where:

$$\rho_{material} = \sum_{i=1}^{n} x_i \times \rho_i$$

$$\rho_{web} = BW/t$$

With: S—Solidity [=] percent
$\rho_{web}$—Web bulk density [=] g/cm³
$\rho_{material}$—Density of material making up the web [=] g/cm³
$\rho_i$—Density of web component i [=]g/cm³
$x_i$—Weight fraction of component i in web [=] fraction
BW—Web basis weight [=] g/cm²
t—web thickness [=] cm Airflow Resistance Test Method Specific airflow resistance is evaluated as prescribed in ASTM C522 standard test method. The specific airflow resistance of an acoustical insulating material is one of the properties that determine its sound-absorptive and sound-transmitting properties. Values of specific airflow resistance, r, are reported as mks rayl (Pa·s/m). Samples are prepared by die cutting a 13.33 cm-diameter circular sample. If edges are slightly compressed from the die cutting operation, edges must be returned to original or natural thickness before testing. The preconditioned samples are placed in a specimen holder at the pre-measured thickness and pressure difference measured over a 100 cm² face area.

Acoustic Performance Parameter Calculation

The Acoustic performance parameter is the product of the Maximum Acceleration (g) and the Airflow Resistance (Rayls/m) of a material.

Example 1

The web of Example 1 was a BUF-PUF Extra Gentle Original sponge 920-06 (3M Company, St. Paul, Minn.).

A laminate was prepared by coupling a carpet from a new 2005 Honda Odyssey having a thickness of 6.72 mm to the BUF-PUF sponge.

Example 2

The web of Example 2 was an E201 Hoover Post Filter Dual V black filtration web (3M Company, St. Paul, Minn.). The filtration web was formed according to the following process:

A lofty nonwoven web approximately 3.81 cm thick and weighing approximately 264 grams per square meter, was formed on an air laid machine from 60% 15 denier (43 micron diameter) 3.2 cm (extended length) and 40% 6 denier (25.1 micron diameter) 3.8 cm (extended length) crimped polyester staple fibers sold by Invista, Wichita, Kans. The lofty nonwoven web was then coated with a binder solution by passing it between a pair of vertically stacked 25.4 cm diameter rubber rollers with 60-70 durometer. Rolls were set with zero clearance, the lower roll rotating in a pan of 30% solids binder resin, Rhoplex TR407, Rohm and Haas Company, Philadelphia, Pa., producing an add-on weight of approximately 113 grams per square meter. The coating was cured by passing the coated web through a forced air oven heated at 179° C. with a residence time of approximately 4 minutes to produce the web.

Example 3

The web of Example 3 was a NOMAD Carpet Matting 8850 (3M Company, St. Paul, Minn.).

Comparative Example C1

Comparative Example C1 was a carpet underlayment obtained from a new 2005 Honda Odyssey that consisted of a carded and cross-lapped acoustic damping material manufactured by Collins & Aikman (Old Fort, N.C.).

Comparative Example C2

Comparative Example C2 was a felt, manufactured by Aksys (Gastonia, Ga.) and sold as a PET Felt Wheel Well Liner.

Comparative Example C3

Comparative Example C3 was a shoddy damping material obtained from a carpet underlayment from a new 2005 Honda Odyssey and manufactured by Collins & Aikman, (Old Fort, N.C.).

A laminate was prepared by coupling a carpet from a new 2005 Honda Odyssey to the shoddy damping material. The carpet had a thickness of 6.72 mm.

Comparative Example C4

Comparative Example C4 was a shoddy damping material obtained from a carpet underlayment from a new 2005 Honda Odyssey manufactured by Janesville-Sackner, Norwalk, Ohio.

The thickness, density, basis weight, and solidity of the webs of Examples 1-3 and Comparative Examples C1-C4 were determined according to methods set for above and the results are reported in Table 1.

The webs of Examples 1-3 and Comparative Examples C1-C4 were tested according to the Airflow Resistance, Work of Compression, Maximum Acceleration, Acoustic Performance, and Damping Loss Factor test methods set forth above and the results are reported in Table 2.

Figure 8:
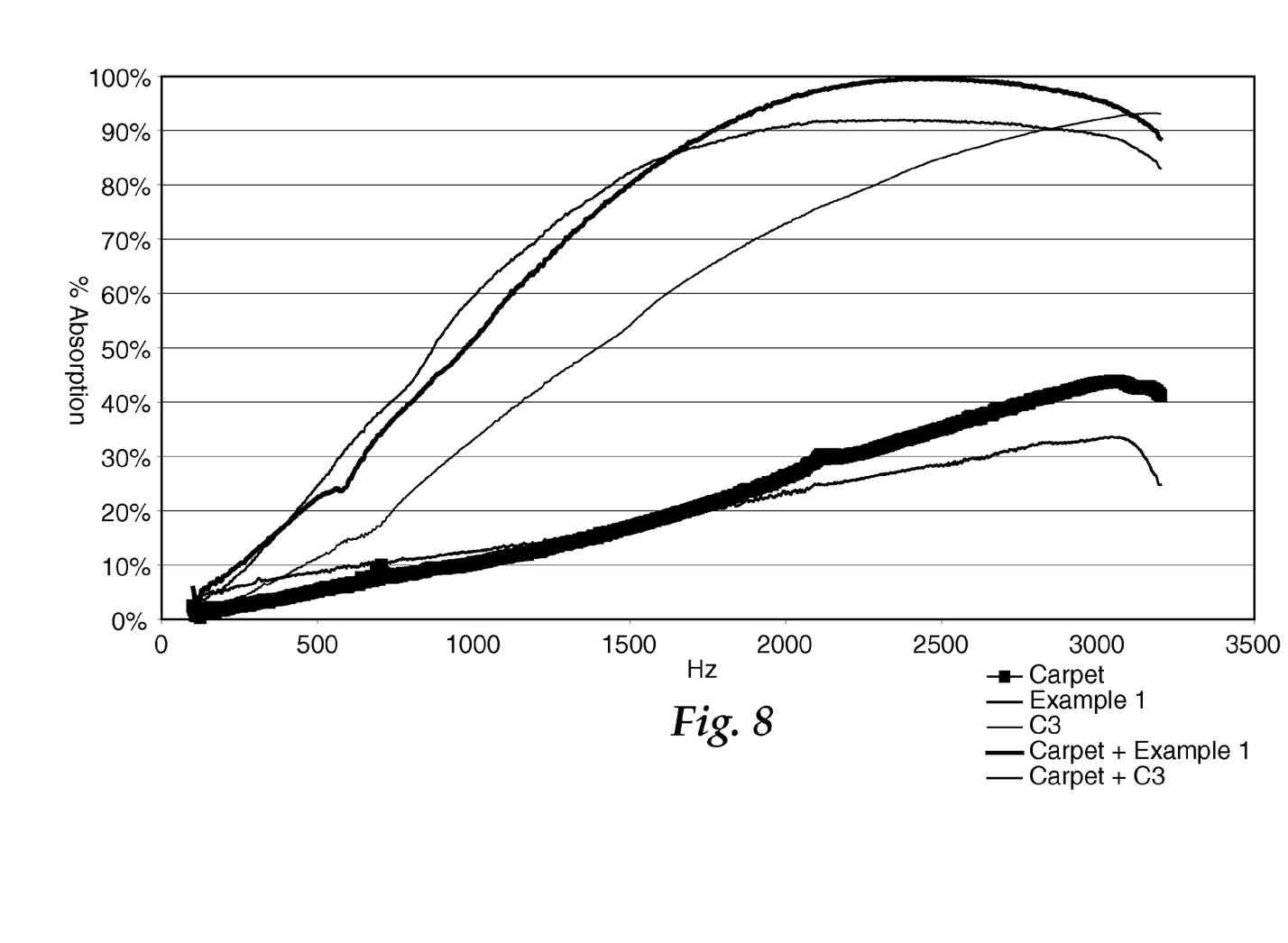
FIG. 8 is a plot of the sound absorption test results of Examples 1 and C3.

The carpet from a new 2005 Honda Odyssey, the web of Example 1, the web of Comparative Example C3, and the laminates of Example 1 and Comparative Examples C3 were tested according to the Sound Absorption test method set forth above, and the results are set forth in Table 3 and FIG. 8.

TABLE 1

| Example | Thickness @ 13.8 Pa (mm) | Density (kg/m$^3$) | Basis Weight (kg/m$^2$) | Web Solidity |
|---|---|---|---|---|
| 1 | 34.26 | 17.38 | 0.60 | 0.01 |
| 2 | 19.06 | 18.98 | 0.36 | 0.01 |
| 3 | 19.10 | 242.70 | 4.64 | 0.20 |
| C1 | 18.97 | 43.70 | 0.83 | 0.03 |
| C2 | 3.86 | 209.99 | 0.81 | 0.15 |
| C3 | 13.72 | 170.21 | 2.34 | 0.12 |
| C4 | 18.00 | 122.07 | 2.20 | 0.09 |

TABLE 2

| Example | Airflow Resistance (Rayls/m) | Work of Compression (kJ/m$^3$) | Maximum Acceleration (g) | Acoustic Performance Parameter (g-Rayls/m) | Damping Loss Factor |
|---|---|---|---|---|---|
| 1 | 1703 | 1.85 | 0.7 | 1.2E+03 | 0.014 |
| 2 | 1563 | 2.00 | 2.3 | 3.6E+03 | 0.017 |
| 3 | 874 | 0.76 | 5.9 | 5.2E+03 | 0.018 |
| C1 | 12656 | 1.69 | 2.4 | 3.0E+04 | 0.020 |
| C2 | 65099793 | 0.64 | 23.9 | 1.6E+09 | 0.023 |
| C3 | 80415 | 0.54 | 11.7 | 9.4E+05 | 0.021 |
| C4 | 48863 | 0.43 | 6.5 | 3.2E+05 | 0.046 |

TABLE 3

| Frequency (Hz) | % Absorption | | | | |
|---|---|---|---|---|---|
| | Carpet | Example 1 | C3 | Carpet + Example 1 | Carpet + C3 |
| 252 | 3 | 6 | 4 | 10 | 9 |
| 500 | 5 | 9 | 11 | 23 | 25 |
| 1000 | 10 | 13 | 33 | 52 | 60 |
| 1500 | 17 | 17 | 54 | 80 | 82 |
| 2000 | 26 | 23 | 73 | 96 | 91 |

The patents and references disclosed herein are incorporated herein by reference in their entirety.

What is claimed is:
1. A sound insulation construction comprising:
   a first layer comprising a bonded fiber nonwoven web exhibiting a work of compression of at least about 0.7 kJ/m$^3$ and an airflow resistance of no greater than 10,000 Rayls/m; and
   a second layer coupled to the first layer, the second layer having an airflow resistance greater than 10,000 Rayls/m and being air permeable,
   wherein the bonded fiber nonwoven web comprises at least one of:
   a) a lofty, open nonwoven web comprising first and second crimped, staple, organic thermoplastic fibers,
   b) a uniform, lofty, nonwoven web comprising interlaced randomly disposed flexible organic thermoplastic fibers;
   c) a lofty, open nonwoven web comprising extruded or melt-spun polymer filament bundles of inter-engaged continuous crinkled coarse filaments of resilient thermoplastic polymer, and
   d) a lofty, sponge-like, compressible nonwoven web comprising randomly intermingled and randomly bonded hydrophobic fibers;
   and wherein individual fibers of the bonded fiber nonwoven web of the first layer are bonded to each other at fiber-bonding points by melt bonding or by a binder that extends between the individual fibers, the fiber-bonding points being distributed throughout the entire thickness of the bonded fiber nonwoven web.

2. The sound insulation construction of claim 1, wherein the first layer exhibits a maximum acceleration of no greater than about 10 g.

3. The sound insulation construction of claim 1, wherein the first layer exhibits a maximum acceleration of no greater than about 3 g.

4. The sound insulation construction of claim 1, wherein the sound insulation construction exhibits at least about 60% absorption at a frequency of 1500 hertz.

5. The sound insulation construction of claim 1, wherein the second layer comprises at least one of headliner facing, carpeting, trunk liner facing, side panel facing, dash facing, hood liner facing, an outwardly facing layer of a wheel well liner, and an outwardly facing layer of an engine cover.

6. The sound insulation construction of claim 1, wherein the second layer comprises a nonwoven web.

7. The sound insulation construction of claim 1, wherein the bonded fiber nonwoven web exhibits an airflow resistance no greater than about 2000 Rayls/m.

8. The sound insulation construction of claim 1, wherein the bonded fiber nonwoven web exhibits an airflow resistance no greater than about 1500 Rayls/m.

9. The sound insulation construction of claim 1, wherein the bonded fiber nonwoven web exhibits an airflow resistance no greater than about 1000 Rayls/m.

10. The sound insulation construction of claim 1, wherein the bonded fiber nonwoven web exhibits a work of compression of at least 1 kJ/m$^3$.

11. The sound insulation construction of claim 1, wherein the bonded fiber nonwoven web has an acoustic performance parameter of no greater than about 10,000 g-Rayls/m.

12. The sound insulation construction of claim 1, wherein the nonwoven web of the first layer comprises fibers having a diameter in the range of from about 25 μm to about 250 μm.

13. The sound insulation construction of claim 12, wherein the nonwoven web of the first layer comprises fibers having a denier of from about 6 to about 400.

14. The sound insulation construction of claim 1, wherein the first layer exhibits a damping loss factor of at least about 0.012.

15. The sound insulation construction of claim 1, wherein the first layer exhibits a density of at least about 15 kg/m$^3$.

16. The sound insulation construction of claim 1, wherein the first layer exhibits a basis weight of at least about 0.2 kg/m$^2$.

17. The sound insulation construction of claim 1, wherein the first layer exhibits a solidity of no greater than about 0.3.

18. The sound insulation construction of claim 1, wherein the first layer has a thickness of least about 5 mm.

19. The sound insulation construction of claim 1, wherein the nonwoven web of the first layer comprises fibers having a length of from about 1 cm to about 10 cm.

20. The sound insulation construction of claim 1, wherein the first layer is adjacent and bonded to the second layer.

21. A multilayer construction coupled to a surface of a structure and adapted to acoustically insulate a source of sound from a receiver, the multilayer construction comprising the sound insulation construction of claim 1.

22. The multilayer construction of claim 21, wherein the structure is selected from the group consisting of machines, appliances, laboratory equipment, medical equipment, power tools, and architectural structures.

23. The multilayer construction of claim 21, wherein the structure forms at least a portion of a motor vehicle and is selected from the group consisting of a wheel well, a trunk, a ceiling, a side panel, a rear gate, a floor panel, a dash panel, a hood, an engine cover, and combinations thereof.

24. The multilayer construction of claim 21, wherein the sound insulation construction is further coupled to a barrier layer, a decoupler layer, and an optional mastic layer, and wherein the multilayer construction forms a carpet laminate.

25. The multilayer construction of claim 21, wherein the sound insulation construction is further coupled to at least one of shoddy, needle punched shoddy, foam, plastic, woven web, nonwoven web, film, and perforated film, and any combinations thereof.

26. An assembly comprising:
a sound insulation construction comprising;
a first layer comprising a bonded fiber nonwoven web exhibiting a work of compression of at least about 0.7 kJ/m$^3$ and an airflow resistance of no greater than 10,000 Rayls/m;
a second layer coupled to the first layer, the second layer having an airflow resistance greater than 10,000 Rayls/m;
wherein the first layer of the sound insulation construction is coupled to an additional layer,
and wherein the bonded fiber nonwoven web comprises at least one of:
a) a lofty, open nonwoven web comprising first and second crimped, staple, organic thermoplastic fibers,
b) a uniform, lofty, nonwoven web comprising interlaced randomly disposed flexible organic thermoplastic fibers;
c) a lofty, open nonwoven web comprising extruded or melt-spun polymer filament bundles of inter-engaged continuous crinkled coarse filaments of resilient thermoplastic polymer, and
d) a lofty, sponge-like, compressible nonwoven web comprising randomly intermingled and randomly bonded hydrophobic fibers;
and wherein individual fibers of the bonded fiber nonwoven web of the first layer are bonded to each other at fiber-bonding points by melt bonding or by a binder that extends between the individual fibers, the fiber-bonding points being distributed throughout the entire thickness of the bonded fiber nonwoven web.

27. The assembly of claim 26, wherein the additional layer comprises metal.

28. The assembly of claim 26, wherein the additional layer comprises an element selected from the group consisting of metal, mastics, foam, chopped fiberglass, fabric, film, and combinations thereof.

29. A sound insulation construction comprising:
a first layer exhibiting a density of at least about 15 kg/m$^3$, a basis weight of at least about 0.2 kg/m$^2$, a solidity of no greater than about 0.3, a thickness of least about 5 mm and a maximum acceleration of no greater than about 10 g, with the first layer comprising a bonded fiber nonwoven web exhibiting an acoustic performance parameter of no greater than about 10,000 g-Rayls/m, a work of compression of at least about 0.7 kJ/m$^3$ and an airflow resistance of no greater than 10,000 Rayls/m; and
a second layer coupled to the first layer, the second layer having an airflow resistance greater than 10,000 Rayls/m and being air permeable,
wherein the bonded fiber nonwoven web comprises at least one of:

a) a lofty, open nonwoven web comprising first and second crimped, staple, organic thermoplastic fibers,
b) a uniform, lofty, nonwoven web comprising interlaced randomly disposed flexible organic thermoplastic fibers;
c) a lofty, open nonwoven web comprising extruded or melt-spun polymer filament bundles of inter-engaged continuous crinkled coarse filaments of resilient thermoplastic polymer, and
d) a lofty, sponge-like, compressible nonwoven web comprising randomly intermingled and randomly bonded hydrophobic fibers;
wherein sound insulation construction exhibits at least about 60% absorption at a frequency of 1500 hertz, individual fibers of the bonded fiber nonwoven web of the first layer are bonded to each other at fiber-bonding points by melt bonding or by a binder that extends between the individual fibers, the fiber-bonding points being distributed throughout the entire thickness of the bonded fiber nonwoven web.

* * * * *

UNITED STATES PATENT AND TRADEMARK OFFICE
CERTIFICATE OF CORRECTION

Page 1 of 1

PATENT NO. : 9,922,634 B2
APPLICATION NO. : 11/743396
DATED : March 20, 2018
INVENTOR(S) : Thompson, Jr. et al.

It is certified that error appears in the above-identified patent and that said Letters Patent is hereby corrected as shown below:

In the Specification

Column 5
Line 2, after "of" insert -- at --.

In the Claims

Column 21
Line 54, in Claim 18, after "of" insert -- at --.

Column 22
Line 55, in Claim 29, after "of" insert -- at --.

Signed and Sealed this
Thirty-first Day of July, 2018

Andrei Iancu
*Director of the United States Patent and Trademark Office*